UNITED STATES PATENT OFFICE.

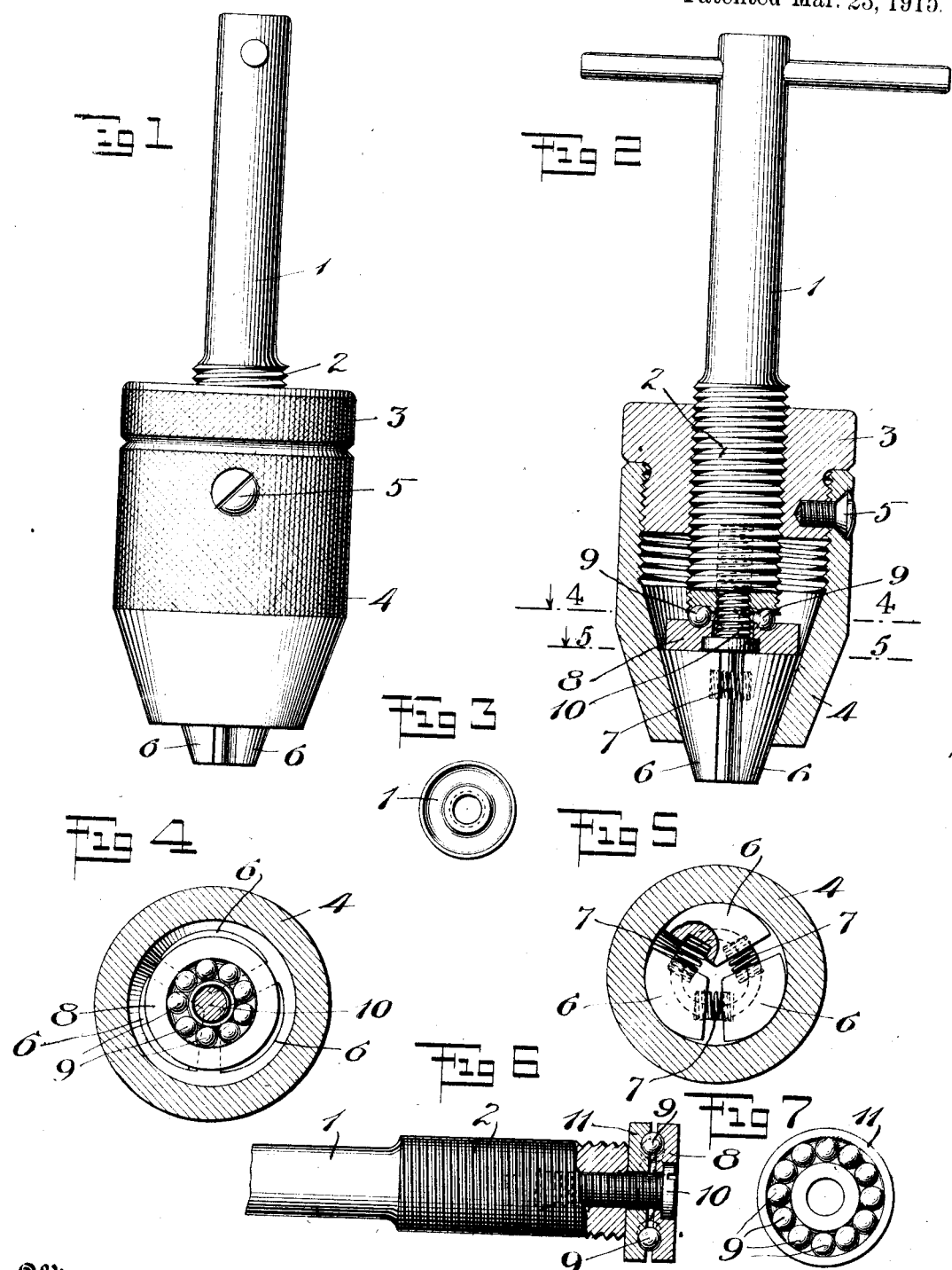

CHRISTIAN BODMER, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

CHUCK.

1,132,550.      Specification of Letters Patent.      Patented Mar. 23, 1915.

Application filed September 4, 1914. Serial No. 860,146.

*To all whom it may concern:*

Be it known that I, CHRISTIAN BODMER, a citizen of the United States, residing at New Britain, county of Hartford, State of Connecticut, have invented certain new and useful Improvements in Chucks, of which the following is a full, clear, and exact description.

My invention relates to improvements in chucks, the main object being to improve and simplify the construction, reducing the amount of friction generated in the operation of the chuck to a very substantial degree whereby the jaws may be effectively tightened upon the tool by a hand alone.

Furthermore it is my aim to so improve the construction that the various parts may be easily assembled.

In the accompanying drawings—

Figure 1 is a side elevation of my improved chuck. Fig. 2 is in the main, a central sectional view. Fig. 3 is a detail. Fig. 4 is a cross section on the plane of the line 4—4. Fig. 5 is a cross section on the plane of the line 5—5. Fig. 6 illustrates a modification. Fig. 7 is a detail thereof.

1 is the stem which is threaded at 2. The jaw actuating shell or sleeve comprises two separable parts 3 and 4. Part 3 is in the form of a block having a central bore threaded to fit upon the thread 2.

4 is a hollow sleeve-like member having an internally tapered passage toward the outer end, the rear end being preferably internally screw threaded to screw on to the forward part of the block 3 and to be fastened thereon by any suitable means so as to practically unite the parts 3 and 4 when in operative position. If desired a screw 5 may be employed to lock the parts 3 and 4 together. 6—6 are tool clamping jaws in this instance three jaws being provided. Between the jaws are spacer springs 7—7 which normally operate to move the jaws apart. The base or rear ends of the jaws bear against an anti-friction washer 8 which may be termed a presser piece rotatably mounted on the inner end of the stem 1 and preferably spaced therefrom by anti-friction balls 9—9. A screw 10 passing loosely through the washer 8 and screwing into the inner end of the stem 1 serves to hold the washer 8 in its proper operative position relatively to the inner end of the stem. In the form shown in Figs. 1 to 6, the anti-friction balls 9 bear directly against the end of the stem 1, but if desired, a separate ball race-plate 11 may be provided between the washer 8 and the stem 1 as shown in the modified form illustrated in Fig. 6. The head of the screw 10 acts as a fixed spacing element to hold the washer 8 at all times close to the end of the stem 1, so that it will move to and fro therewith in the act of operating the jaws 6—6. The outer surface of the operating sleeve may be knurled as indicated in Fig. 1 to facilitate a hand grip. The washer 8 is of greater diameter than the screw passage through the part 3, and hence, the stem 1 cannot be unscrewed from the operating sleeve to such an extent as to permit the parts to become accidentally separated thus avoiding the danger of loss of parts.

In operation the stem 1 is backed off sufficiently to permit the jaws 6—6 to open up so as to admit the shank of a tool. When the tool is in place the stem 1 is rotated in the sleeve in the direction to advance the washer 8 and thereby the jaws 6—6. As the jaws move along the tapered internal wall of the sleeve element 4 they are contracted thereby and pressed into binding engagement with the tool. By reason of the presence of the anti-friction bearing the jaws may be set up very tightly upon the tool by the hand alone.

What I claim is:

1. In a chuck, a threaded stem, a hollow two-part sleeve, with means for positively connecting the same together, one part of said sleeve having a screw threaded passage to receive said threaded stem, the other part of said sleeve having an internal tapered wall, a plurality of tool-gripping jaws within said sleeve engaging and being guided wholly by said tapered wall and being free to shift around said wall, a jaw presser piece rotatably mounted at the inner end of said stem to be carried to and fro thereby, said presser piece engaging the rear ends of said jaws for operating the same on the movement of said stem.

2. In a chuck, a threaded stem, a hollow two-part sleeve, with means for positively connecting the same together, one part of said sleeve having a screw threaded passage to receive said threaded stem, the other part of said sleeve having an internal tapered wall, a plurality of tool-gripping jaws within said sleeve engaging and being guided wholly by said tapered wall and being free to shift around said wall, a jaw presser piece rotatably mounted at the inner end of said stem to be carried to and fro thereby, said presser piece engaging the rear ends of said jaws for operating the same on the movement of said stem, said presser piece being of larger diameter than the diameter of the threaded part of said stem.

3. In a chuck, a threaded stem, a hollow two-part sleeve, with means for positively connecting the same together, one part of said sleeve having a screw threaded passage to receive said threaded stem, the other part of said sleeve having an internal tapered wall, a plurality of tool-gripping jaws within said sleeve engaging and being guided wholly by said tapered wall and being free to shift around said wall, a jaw presser piece rotatably mounted at the inner end of said stem to be carried to and fro thereby, said presser piece engaging the rear ends of said jaws for operating the same on the movement of said stem, and a row of antifriction balls arranged between said presser piece and the adjacent end of said stem.

CHRISTIAN BODMER.

Witnesses:
 WILLIAM A. BODWELL,
 HOMER JETTE.